G. RICHARDSON.
Winding on Bobbins.
No. 84,764. Patented Dec. 8, 1868.
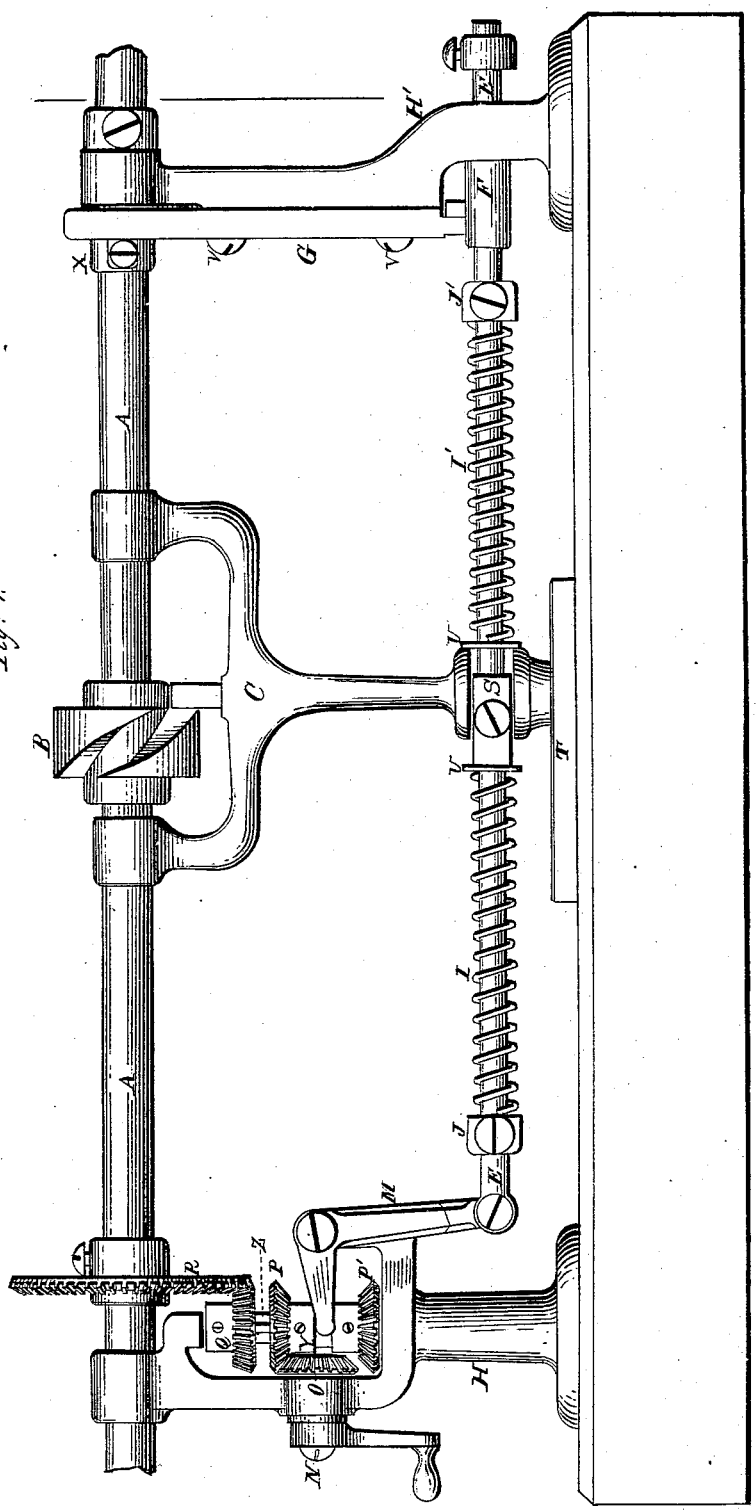
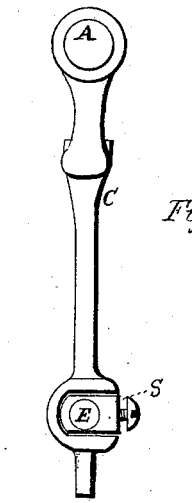
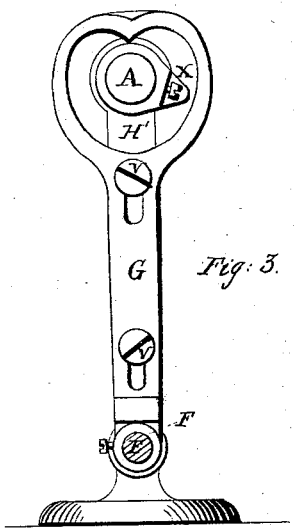

UNITED STATES PATENT OFFICE.

GEORGE RICHARDSON, OF LOWELL, MASSACHUSETTS.

IMPROVED REVERSE-MOTION FOR WINDING ON BOBBINS.

Specification forming part of Letters Patent No. 84,764, dated December 8, 1868.

*To all whom it may concern:*

Be it known that I, GEORGE RICHARDSON, of Lowell, in the county of Middlesex and State of Massachusetts, have invented a new and useful Reverse-Motion for Winding Fibrous Material upon Bobbins; and I do hereby declare that the following is a full, clear, and exact description of the construction and operation of the same, reference being had to the annexed drawings, making a part of this specification, in which—

Figure 1 is a longitudinal elevation, and Figs. 2 and 3 elevations of certain parts from another point of view, and referring to the several parts by letters marked thereon.

In order to wind cotton, yarn, roving, or other fibrous material upon bobbins in a perfect and even manner it is necessary to impart an alternating traverse motion to "the wind," so called.

The nature of my invention consists in providing a more perfect and simple reversing attachment for such traverse motion.

To enable others skilled in the art to make and use my invention, I will proceed to describe its construction and operation, as follows:

A represents a portion of a shaft imparting the aforesaid traverse motion to the wind; B, a spiral cam, made fast to shaft A, and imparting motion to a sliding yoke, C; E E, reverse-rod; F, a catch fastened to reverse-rod; I I', spiral springs surrounding reverse-rod, their inside ends bearing against the sliding washers U U' and outside ends against collars J J'; M, reverse-catch; N, driving-shaft; O, bevel-gear on shaft N; P P', two bevel-gears, forming one piece with the collar Y, and imparting rotary motion to the shaft Z, upon which shaft they may also be traversed by reverse-catch M; G, a detent, moved by cam X on shaft A; Q and R, gears imparting motion from Z to A. T is a slotted guide for yoke C.

The operation of my invention is as follows: The shaft N, with its gear O, has continuous motion in one direction. With the geared piece Y in position, so that gear P is in contact with O, shaft A will turn, imparting motion by cam B to yoke C, thereby compressing spring I on reverse-rod E. When yoke C has passed over the extent of its traverse, detent G is raised by cam X on shaft A, thereby releasing catch F. Spring I instantly reacts, forcing reverse-rod E in direction of H. This moves gear P out of and gear P' into contact with O by means of reverse-catch M. The motion of A is now, by this change, reversed, while the motion of N will continue the same. Detent G will be lowered by cam X, retaining reverse-rod E in its new position until cam B shall have moved yoke C in the opposite direction, compressing spring I'. Then detent G will be again raised, when spring I' will react and bring gear P into contact with O by means of reverse-rod E and reverse-catch M, in like manner as before described.

What I claim as my invention, and desire to secure by Letters Patent, is—

The cam B, yoke C, reverse-rod E, springs I I', detent G, and reverse-catch M, all combined, substantially as and for the purpose set forth.

GEO. RICHARDSON.

Witnesses:
 WM. E. BARROWS,
 WILLIAM CLARK.